US007656886B2

(12) United States Patent
Lea et al.

(10) Patent No.: US 7,656,886 B2
(45) Date of Patent: Feb. 2, 2010

(54) NON-BLOCKING INTERNET BACKBONE NETWORK

(76) Inventors: Chin-Tau Lea, EEE Department, The Hong Kong University of Sciences and Technology, Clear Water Bay, Kowloon (HK); Jian Chu, EEE Department, The Hong Kong University of Sciences and Technology, Clear Water Bay, Kowloon (HK)

( * ) Notice: Subject to any disclaimer, the term of this patent is extended or adjusted under 35 U.S.C. 154(b) by 567 days.

(21) Appl. No.: 11/243,117

(22) Filed: Oct. 3, 2005

(65) Prior Publication Data

US 2006/0176809 A1 Aug. 10, 2006

Related U.S. Application Data

(60) Provisional application No. 60/650,341, filed on Feb. 7, 2005.

(51) Int. Cl.
*H04L 12/56* (2006.01)
(52) U.S. Cl. ...................... 370/401; 370/238
(58) Field of Classification Search ................. 370/477, 370/230, 468, 437, 431, 238, 356, 401; 709/238, 709/232, 224
See application file for complete search history.

(56) References Cited

U.S. PATENT DOCUMENTS

| | | | | |
|---|---|---|---|---|
| 6,804,199 | B1 * | 10/2004 | Kelly et al. | 370/238 |
| 2002/0143929 | A1 * | 10/2002 | Maltz et al. | 709/224 |
| 2003/0068975 | A1 | 4/2003 | Qiao et al. | |
| 2003/0072267 | A1 | 4/2003 | Lohtia et al. | |
| 2003/0072327 | A1 | 4/2003 | Fodor et al. | |
| 2003/0118024 | A1 | 6/2003 | Lee et al. | |
| 2003/0118027 | A1 | 6/2003 | Lee et al. | |
| 2003/0161268 | A1 | 8/2003 | Larsson et al. | |
| 2003/0174688 | A1 | 9/2003 | Ahmed et al. | |
| 2003/0185209 | A1 | 10/2003 | Lee | |
| 2003/0198235 | A1 * | 10/2003 | Weldon et al. | 370/401 |
| 2003/0202465 | A1 | 10/2003 | Cain | |
| 2003/0202468 | A1 | 10/2003 | Cain et al. | |
| 2003/0202469 | A1 | 10/2003 | Cain | |
| 2003/0202476 | A1 | 10/2003 | Billhartz et al. | |
| 2003/0204587 | A1 | 10/2003 | Billhartz | |

(Continued)

OTHER PUBLICATIONS

Applegate et al., "Making Intra-Domain Routing Robust to Changing and Uncertain Traffic Demands: Understanding Fundamental Tradeoffs", Proc. ACM 2003.

(Continued)

*Primary Examiner*—Kwang B Yao
*Assistant Examiner*—Syed Bokhari

(57) ABSTRACT

A method and system for computing the maximum amount of admissible ingress and egress traffic of each edge router of the MPLS core network is presented. As long as the ingress and egress traffic amounts are below the admissible amount limit, traffic routes through any link in the network will never exceeds the link capacity. A calculation scheme and a load-distribution scheme make an Internet MPLS backbone network non-blocking. The output of the route computation algorithm includes a set of paths for any source-destination pair and the load distribution ratios among the paths. The routing algorithm and the associated distribution scheme will determine how to balance the loads that meet the distribution requirements specified by the ratios computed from the route algorithm. This greatly simplifies call admission control and allows hard QoS to be supported in a large scale and cross domains in the Internet.

19 Claims, 2 Drawing Sheets

U.S. PATENT DOCUMENTS

| | | |
|---|---|---|
| 2003/0204616 A1 | 10/2003 | Billhartz et al. |
| 2003/0204619 A1* | 10/2003 | Bays .......................... 709/238 |
| 2003/0204623 A1 | 10/2003 | Cain |
| 2003/0204625 A1 | 10/2003 | Cain |
| 2003/0229613 A1 | 12/2003 | Zargham et al. |
| 2004/0022203 A1 | 2/2004 | Michelson et al. |
| 2004/0022223 A1 | 2/2004 | Billhartz |
| 2004/0022224 A1 | 2/2004 | Billhartz |
| 2004/0029553 A1 | 2/2004 | Cain |
| 2004/0037294 A1 | 2/2004 | Yamaguchi et al. |
| 2004/0042404 A1 | 3/2004 | Ravindran et al. |
| 2004/0042473 A1 | 3/2004 | Park et al. |
| 2004/0057724 A1 | 3/2004 | Oksanen et al. |
| 2004/0067754 A1 | 4/2004 | Gao et al. |
| 2004/0071089 A1 | 4/2004 | Bauer et al. |
| 2004/0071468 A1 | 4/2004 | Doh et al. |
| 2004/0073701 A1 | 4/2004 | Huang et al. |
| 2004/0081197 A1 | 4/2004 | Liu |
| 2004/0114569 A1 | 6/2004 | Naden et al. |
| 2004/0136324 A1 | 7/2004 | Steinberg et al. |
| 2004/0143842 A1 | 7/2004 | Joshi |
| 2004/0184483 A1* | 9/2004 | Okamura et al. ............ 370/477 |
| 2004/0190526 A1 | 9/2004 | Kumar et al. |
| 2004/0192204 A1 | 9/2004 | Periyalwar et al. |
| 2004/0196787 A1 | 10/2004 | Wang et al. |
| 2004/0196860 A1* | 10/2004 | Gao et al. ................... 370/437 |
| 2004/0203820 A1 | 10/2004 | Billhartz |
| 2004/0213172 A1 | 10/2004 | Myers et al. |
| 2004/0213198 A1 | 10/2004 | Mahmood et al. |
| 2004/0213255 A1 | 10/2004 | Brinkerhoff et al. |
| 2004/0214576 A1 | 10/2004 | Myers et al. |
| 2004/0215817 A1* | 10/2004 | Qing et al. ................. 709/238 |
| 2004/0221154 A1 | 11/2004 | Aggarwal |
| 2004/0228304 A1 | 11/2004 | Riedel et al. |
| 2004/0228323 A1 | 11/2004 | Acharya et al. |
| 2004/0233850 A1 | 11/2004 | Randriamasy et al. |
| 2004/0233907 A1 | 11/2004 | Hundscheidt |
| 2004/0246900 A1 | 12/2004 | Zhang et al. |
| 2004/0246901 A1 | 12/2004 | Zhang et al. |
| 2004/0264372 A1 | 12/2004 | Huang |
| 2004/0264466 A1 | 12/2004 | Huang |
| 2005/0114541 A1* | 5/2005 | Ghetie et al. ................ 709/232 |
| 2007/0115814 A1* | 5/2007 | Gerla et al. ................. 370/230 |

OTHER PUBLICATIONS

Blake et. al., "An Architecture for Differentiated Services," RFC 2475, Dec. 1998.

Cetinkaya et al., "Egress Admission Control," Proc. IEEE Infocom 2000, Mar. 2000.

Chu et al., "Maximizing EF-Class Traffic in DiffServ Networks," to be published.

Duffield et al., "A Flexible Model for Resource Management in Virtual Private Networks," in ACM Sigcomm, San Diego, California, USA, Aug. 1999.

Erlebach et al., "Optimal Bandwidth Reservation in Hose-Model VPNs with Multi-Path Routing", IEEE Infocom 2004.

Giordano et. al.,"Advanced QoS provisioning in IP networks: The European Premium IP Projects," IEEE Communication Magazine, Jan 2003.

Gupta et al., "Provisioning a Virtual Private Network: A Network Design Problem for Multicommodity Flow", Proc. ACM 2001.

Ivars et al., "PBAC: Probe-Based Admission Control," Proc. QoFIS 2001,2001, pp. 97-109.

J. Chu et al., "Fast Algorithms for Hose-Model VPNs Construction" to be published.

James R. Leu et al., "Label Aggregation Technique for LDP," www.draft-leu-mpls-ldp-label-aggregation-00.txt, Internet draft, IETF, Jul. 2000.

Jian Chu et al., "Routing and Restoration in Networks with Hose-Model Traffic Patterns," to be published.

Jüttner et al., "On Bandwidth Efficiency of the Hose Resource Management Model in Virtual Private Networks," In IEEE Infocom, San Francisco, Apr. 2003.

Knightly et al., "Admission Control for Statistical QoS: Theory and Practice," IEEE Network, vol. 13, No. 2, Mar. 1999, pp. 20-29.

Kumar et al. "Algorithms for Provisioning Virtual Private Networks in the Hose Model," in ACM Sigcomm, Cambridge, Massachusetts, USA, Aug. 2001.

Rosen & Rekhter, BGP/MPLS VPNs, memo, Mar. 1999.

Zhang et al., "Decoupling QoS Control from Core Routers: A Novel Bandwidth Broker Architecture for Scalable Support of Guaranteed Services," Proc. ACM Sigcomm, Aug./Sep. 2000.

Apostolopoulos et al., "QoS Routing Mechanism and OSPF Extensions," RCF 2676, Network Working Group, Aug. 1999.

Fonz et al., "Internet Traffic Engineering by Optimizing OSPF Weights," Proc. IEEE INFOCOM, Mar. 2000.

Kodialam et al., "A Simple Traffic Independent Scheme for Enabling Restoration Oblivious Routing of Resilient Connections," IEEE INFOCOM, 2004.

Rosen et al., "Multiprotocol Label Switching Architecture," RCF 3031, Network Working Group, Jan. 2001.

* cited by examiner

NON-BLOCKING INTERNET BACKBONE NETWORK

CROSS-REFERENCE TO RELATED APPLICATION

This application claims the benefit of previously filed provisional application entitled "QoS Routing Methods and the Design of a Non-Blocking Internet Backbone Network," filed on Feb. 7, 2005, with Ser. No. 60/650,341, and the entire disclosure of which is herein incorporated by reference.

BACKGROUND

1. Field of the Invention

This invention relates to techniques for maintaining the hard quality of service (QoS) of the developing Internet. In particular, it relates to a method and system for controlling the admissible ingress and egress traffic of edge routers of the Multiprotocol Label Switching (MPLS) core network for achieving a non-blocking Internet backbone network.

2. Description of Related Art

Internet Protocol (IP) networks are traditionally designed to support a best-effort service, with no guarantees on the reliability and the timely delivery of the packets. As IP networks mature and are increasingly been used to support real-time applications, such as voice onto IP-based platforms, the existing IP networks need to provide a new level of QoS for such new applications. Differentiated Services (DiffServ) and MPLS have become the main QoS architecture for the Internet. DiffServ avoids per-flow bandwidth reservation inside the network. It classifies flows into aggregates (classes), and provides appropriate QoS for the aggregates. A small bit-pattern in each packet—the ToS octet of Ipv4 or the Traffic Class octet of Ipv6—is used to mark a packet for receiving a particular forwarding treatment at each network node. A service level agreement (SLA), is signed between a service providers and customers to specify the type of services and the amount of traffic required for each type. An SLA codifies what a provider promises to deliver in terms of what, how, and associated penalties for failures.

QoS requirements of SLAs need to be achieved with components in both the data-plane and the control-plane. Data-plane components include traffic shaping and policing, traffic classification, scheduling and buffer management. Control-plane components include SLA creation and configuration, signaling and SLA admission control (SAC) and network provisioning/traffic engineering. Effective implementations of data-plane components are well understood and available; only local state information in a router or switch is required. In contrast, control-plane components, such as SAC and network dimensioning, remain open issues. The challenges of the control-plane design arise from the fact that the implementations of control-plane components need the state information of the entire network. Typically there are millions of flows traveling through a high-speed link, and therefore maintaining the state information of all links of the entire network is simply not practical.

There are several proposals for SAC. The general concerns about these proposals include the following.

(a) Scalability and Effectiveness: referring to FIG. 1, the network equipment that performs provisioning, resource management and SAC is called bandwidth broker (BB). BB architecture implies that admission control decisions are made at a central location for each administrative domain, such as ISP A 101 and ISP B 105. Although the cost of handling service requests is significantly reduced, it is unlikely that this approach can be scaled upward for large networks. In order to cope with scalability, most relevant studies adopt distributed admission control schemes, which are further distinguished into model-based and measurement-based approaches. Both approaches assess QoS deterioration probability upon service request arrivals; model based approaches maintain state information for active services and employ mathematical models, whereas measurement-based approaches rely on either passive or active aggregate measurements. The main concern is the effectiveness of the schemes. The centralized SAC, although not scalable, can provide better QoS than the distributed admission control scheme.

(b) Applicability y to Inter-domain QoS All SAC schemes must fully address the inter-domain QoS issues. It is anticipated that there will be significant variation in the implementations and resource management strategies from one ISP to another. It is unlikely that we will find a unified approach across the Internet. Cascading different QoS approaches will work only if they cooperate with each other. That is difficult to achieve. For example, if one network uses measurement-based SAC and the other uses model-based SAC, it is unlikely that the end-to-end QoS can be achieved as anticipated for an SLA path passing through the two networks While some QoS capabilities based on isolating voice traffic over IP are currently evolving (e.g., DiffServ, MPLS), providing end-to-end QoS at a large scale and across domain boundaries remains a challenging and unsolved problem. Thus a need exists for designing a new and practical SAC scheme to maintain the QoS in the future Internet.

SUMMARY

This invention uses the concept of non-blocking network to solve the QoS problem and simplify the SAC design of the future Internet. Among the advantages of the invention comprise one or more of the following: one advantage of the claimed invention is to provide a non-blocking network. A network is called non-blocking if it can always accommodate a new SLA as long as the source and destination routers have capacity to set up the flow. One advantage of the invention is that, if a network is non-blocking, its SAC will be greatly simplified as we do not need to check the capacity utilization of all internal links. According to the method and system of this invention, only the ingress and egress points need to be verified for accepting a new SLA. As demonstrated in FIG. 2, assuming a new SLA from router A 201 to router D 205 needs to be added. If the network is non-blocking, we only need to check if the ingress router (i.e. router A 201) and the egress router (i.e. router D 205) have capacity to accommodate the new SLA. The complex task of monitoring each link inside the network, such as links 210, 215, 220, 225, and 230, can be avoided.

Given a network topology and its link capacities, the present invention provides a way to determine a set of paths for any given source-destination pair in an MPLS network and the maximum admissible ingress and egress traffic. As long as the ingress and egress traffic is within this specified amount and the routing follows the determined paths and the associated load-distribution scheme, none of the internal links will ever exceed the link capacity. Thus, the network is non-blocking internally. As an added advantage, the techniques are well suited for the class of traffic demanding the best QoS, but can also be used with other types of data traffic.

Yet another advantage of this invention is the flexibility in the "turning-on" and "turning-off" of the method and system of the invention according to other relevant considerations in the overall bus utilization or overall performance.

A SAC scheme is invented which decides whether a new SLA can be added to the network. The SAC scheme only requires the source and destination edge routers to monitor their ingress and egress traffic situations and there is no need to check the state information of internal links of the network. The SAC scheme also includes a load-distribution scheme to balance the loads among the paths assigned for each source-destination pair.

Additional constraints can be added to the paths generation scheme. For example, we can specify that a maximum of k routes will be used for any given source-destination pair, or we can specify the hop-count limit for all the paths. We then use the algorithm described in the patent to compute the maximum admissible ingress and egress traffic. As long as the total ingress and egress traffic is within the admissible constraints, the network is still non-blocking.

Furthermore, we can set an arbitrary amount as the admissible ingress and egress traffic constraints and compute the capacities of internal links of the network such that the network is non-blocking. Along with the internal link capacities are the paths for each source-destination pair and the associated load-distribution ratios among these paths.

Further features of the invention, its nature and various advantages will be more apparent from the accompanying drawings and the following detailed description of the invention.

BRIEF DESCRIPTION OF THE DRAWINGS

FIG. 3($b$) is a schematic representation of a sample balancing scheme.

Like reference numbers and designations in the different figures indicate like elements.

DETAILED DESCRIPTION

This invention involves the novel design of a non-blocking network. In this invention, a method and a system for determining traffic constraints, routes, and load-distribution among the routes to achieve non-blocking inside an MPLS Internet backbone network are implemented.

The invention will be illustrated in conjunction with illustrative embodiments of a network and an associated route computation and load-distribution scheme. It should be understood, however, that the invention is not limited to use with the particular network system or node implementation described, but is instead more generally applicable to any route computation algorithm that intends to make network non-blocking.

Assume a network has n edge routers. The techniques of this invention will produce the following outputs.

The ingress and egress admissible traffic constraints, denoted by $(\alpha_i, \beta_i)$, $1 \leq i \leq n$, of all edge routers. This determines how much traffic each edge router can inject into or receive from the network without causing overflow on any link The routing method will generate a fixed number of paths, say 4 in our example, between any pair of nodes. The four paths from edge router i to edge router j are denoted by $p_{ij}^1$, $p_{ij}^2, p_{ij}^3, p_{ij}^4$ and the associated load-balancing ratios $v_{ij}^1, v_{ij}^2, v_{ij}^3, v_{ij}^4$. For all traffic from edge router i to edge router j, the network will split the load among the paths according to the ratios $v_{BC}^1, v_{BC}^2, v_{BC}^3, v_{BC}^4$.

Figure 1:
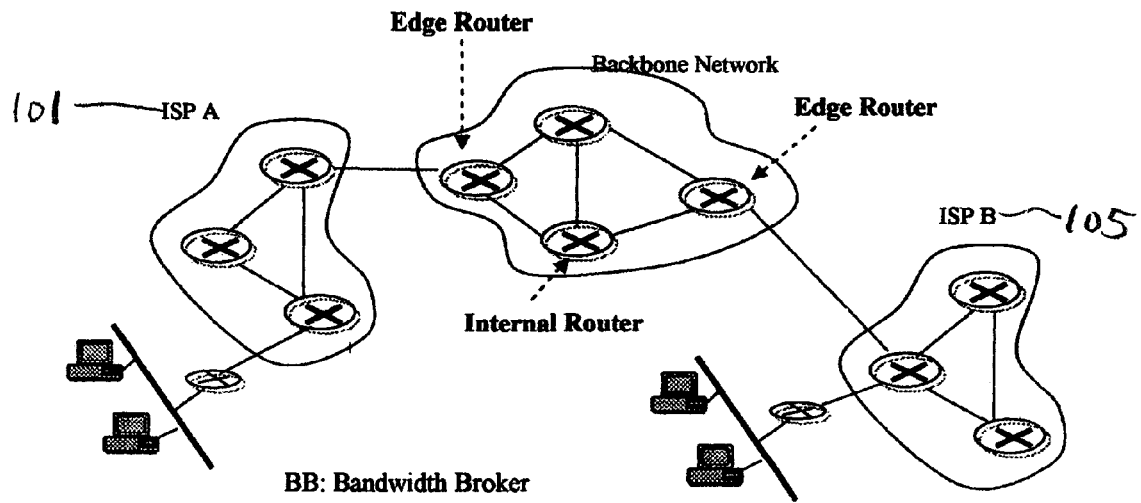
FIG. 1 is a schematic representation of the traditional bandwidth broker infrastructure.
Figure 2:
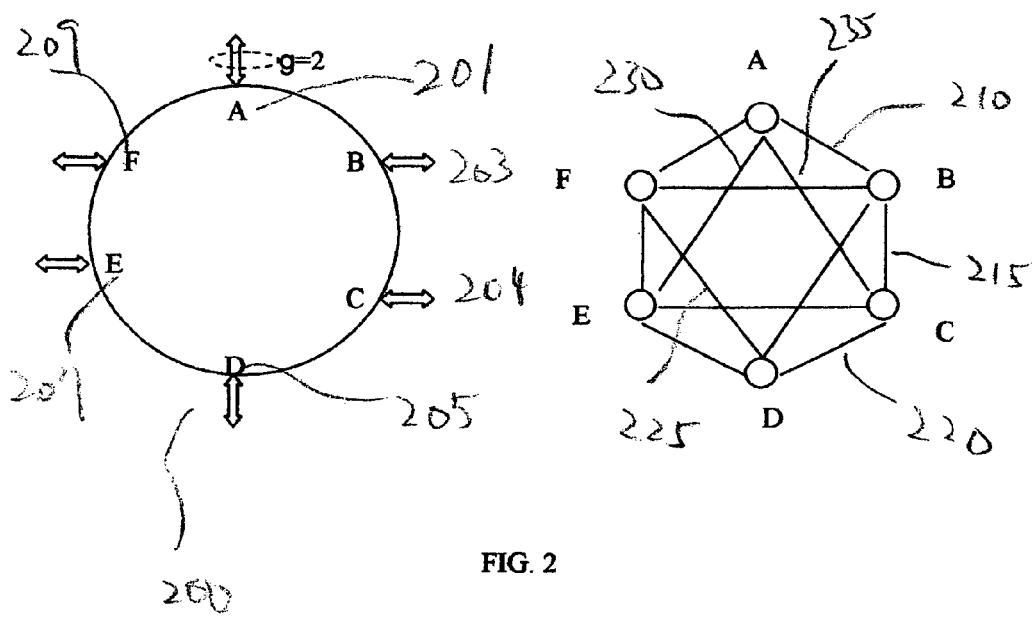
FIG. 2 is a schematic representation of internal links connecting the various edge routers within a network.

Referring to FIG. 2, which illustrates a network 200 with, for example, six routers which are all edge routers: router A 201, router B 203, router C 204, router D 205, router E 207, router F 209. All routers 201-207 are connected to the outside world. All links, such as link AB 201, link BC 216, link CD 220, link DF 225, and link EA 230, have the same capacity of 1 unit on both directions and all edge routers have the same admissible ingress and egress traffic constraints—that is, $\alpha_i = \beta_i = \gamma$, $1 \leq i \leq n$. Using our techniques, we find the following:

1. $\gamma=2$, where $\gamma$ is the amount of traffic that any router A 201, B 203, C 204, D 205, E 207, F 209 can only inject into or receive from the network.

2. A set of paths for each (source, destination) pair. We can use (A, B) and (A,D) as an example. The rest of the paths can be deduced accordingly.
   (i) (A, B): three paths: A-B 210, A-C-B, A-F-B. The load-balancing ratios are 0.5, 0.25, 0.25.
   (ii) (A,D): A-B-D, A-C-D, A-E-D, A-F-D. Each path gets 0.25 of traffic from A to D.
   (iii) Because of symmetry of the network, we can derive the paths and split ratios for other pairs as well. For example, for (A, C) we use three paths: A-C (0.5), A-E-C (0.25) and A-B-C (0.25).

Consider the traffic injected by all routers into the network. As long as the total amount does not exceed 2 and as long as the destination routers will not receive more than 2 from all the routers, it can be verified that the traversing traffic on any internal link will never exceed 1 regardless of the distribution of the traffic inside the network. This make the SAC decision of a new SLA easy because we only need to check the source and destination routers and see if adding the new SLA will violating the ingress and egress admissible constraints. For example, suppose we want to set up a new SLA with rate=0.5 from A 201 to B 203. We first check if B (203)'s current load has exceeded 1.5. If not, accept the SLA. Otherwise, reject it. We don't need to check the status of each link inside.

Figure 3:
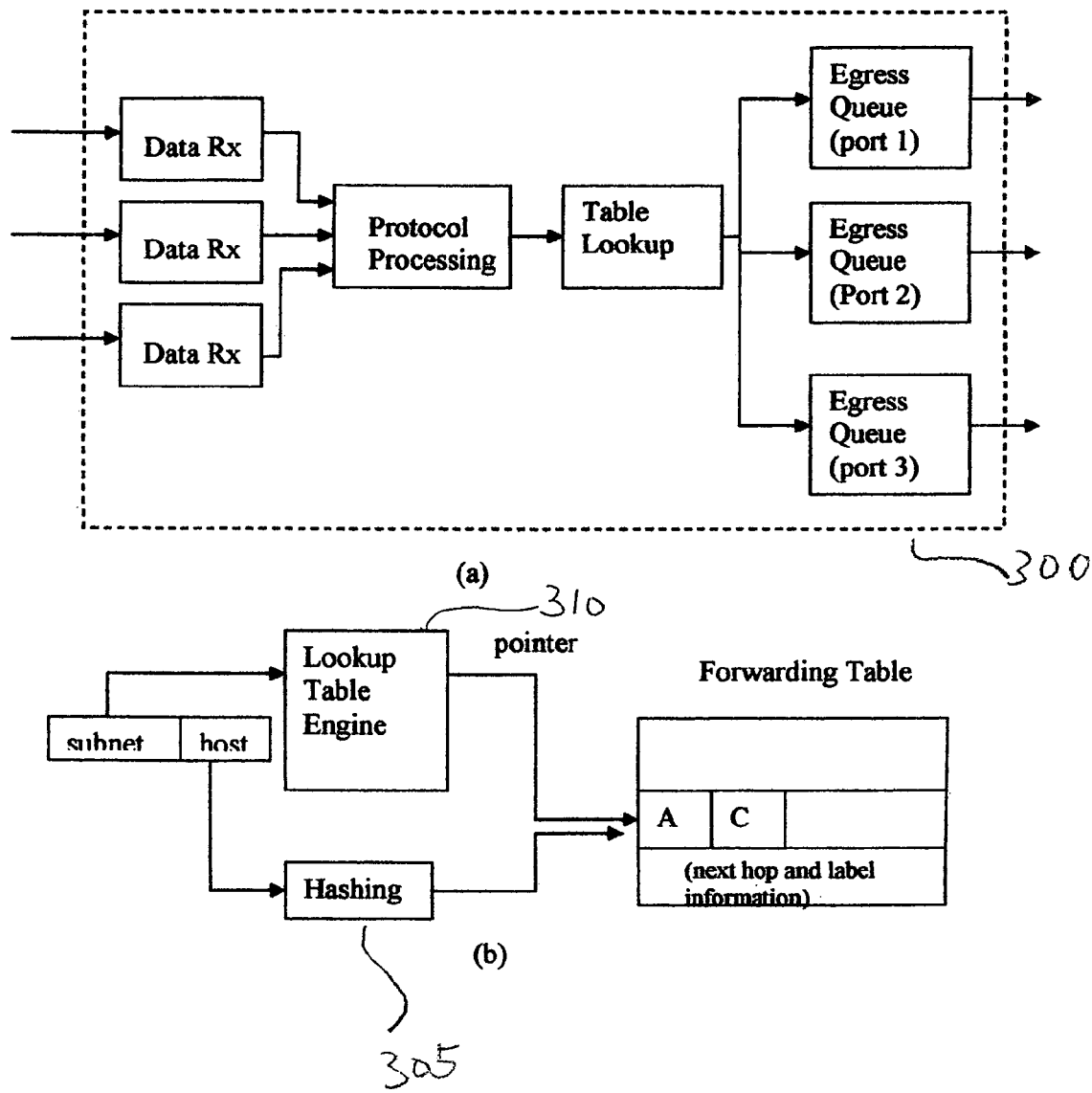
FIG. 3($a$) is a schematic representation of a protocol processor.

The techniques can also answer the reversed question: What is the internal link bandwidth that can make the network non-blocking for $\gamma=3$? The answer is 1.5. It is easily derived from the example by just scaling up the link capacity accordingly. To implement the scheme, the lookup engine in a router needs to do load-balancing according to the computed load-balancing ratios. It also needs to do this without causing out-of-sequence transmissions. There are many ways to do the load balancing. One example is shown in FIG. 3. FIG. 3($a$) shows a standard protocol processor 300. FIG. 3($b$) is a schematic representation of a load-balancing unit with the lookup table engine 310 conducting load balancing according to computed load-balancing ratios. The hashing performed by the unit 305 maps the hose number field of the IP address into a random number between [0, M]. Bases on the result we select a path. For example, if the range is [0,99] and there are three pre-determined paths with load-distribution ratios: 0.2, 0.4, 0.4. If the output of the hashing unit 305 is between [0, 19], we use the first path. If it is in the range [20,59], the second path; if in the range [60,99], the third path. Alternatively, We can also use (destination host+TCP channel) as the input of the hashing unit. This can do load-balancing with a finer granularity.

Path Setup Algorithms for Non-blocking Backbone Networks

Let $(\theta\tilde{\alpha}_i, \theta\tilde{\beta}_i)$ represent the maximum amount of ingress and egress traffic allowed to enter the network at the edge router i, where $\tilde{\alpha}_i$ and $\tilde{\beta}_i$ are constants describing the degree of unevenness of traffic patterns in the network and $\theta$ is a parameter to be maximized in our design. For example, suppose $(\tilde{\alpha}_1=5, \tilde{\beta}_1=5)$ and $(\tilde{\alpha}_2=15, \tilde{\beta}_2=15)$, then the traffic allowed at edge router 2 is three times that of router 1. Note that only the relative—not absolute—magnitudes of $\tilde{\alpha}_i$ and $\tilde{\beta}_i$ have significance as the real amount of admissible traffic is determined by $\theta$.

We assume the network has n edge routers and the ingress and egress bandwidth constraints of each router are given in the following H vectors $$H=[(\theta\tilde{\alpha}_1, \theta\tilde{\beta}_1), \ldots (\theta\tilde{\alpha}_n, \theta\tilde{\beta}_n)] \quad (1)$$

Compared with a conventional traffic matrix $T=\{d_{ij}\}$, where $d_{ij}$ represents the traffic rate from node i to node j, we must have $$\sum_j d_{ij} \leq \theta\tilde{\alpha}_i \text{ and } \sum_i d_{ij} \leq \theta\tilde{\beta}_j.$$

For a given H, there are many traffic matrices Ts that satisfy the constraints imposed by H. A traffic matrix $T=\{d_{ij}\}$ that does not violate the constraints imposed by H is called a valid traffic matrix. Let D be the set of all valid Ts.

The backbone network can be described as a directed graph G (V,E) with capacity $c_e$ for link $e \in E$. Let $Q \subseteq V$ be the set of edge routers of the backbone network with $n=\|Q\|$. So Q is the set of edge nodes, or provider edge (PE) routers defined in a MPLS network, that to the outside world. Let $x_{ij}^e$ represent the portion of traffic from node $i \in Q$ to $j \in Q$ that is routed through link e and $0 \leq x_{ij}^e \leq 1$. Once we have $x_{ij}^e$, we have determined the paths from edge router i to j. Our routing techniques determine two things:

The traffic allocation variables $x_{ij}^e$.

The maximum ingress and egress bandwidth ($\theta\tilde{\alpha}_i$, $\theta\tilde{\beta}_i$) (Note that $\tilde{\alpha}_1$, $\tilde{\beta}_1$ are given) that can be admitted to the network at edge router i without destroying the non-blocking property of the backbone network.

The patent describes several methods to compute the routes and the maximum $\theta$ such that the backbone network is non-blocking. Define link utilization for a link as the ratio of total traffic going though the link over the link capacity. The congestion ratio, denoted by r, of a network is defined as the maximum link utilization of all links. When $r > 1$ for a link, it means that overflow will occur on that link and its value indicates the amount of excessive traffic on that link. Our first method will compute the maximum admissible ingress and egress traffic at each node based on the concept of congestion ratio. By computing the minimum r, we thus maximize the amount of admissible ingress and egress traffic. The problem is formulated as a linear programming problem. The results also include the routes for every ingress and egress pair.

Method 1

The link congestion ratio is defined as the ratio of the amount of traffic routed through a link over the link's capacity. The network congestion ratio, denoted by r, is defined as the maximum value of all its link congestion ratios. We first assume the ingress and the egress traffic constraints at edge router i are $(\tilde{\alpha}_i, \tilde{\beta}_i)$. We then compute the congestion ratio r. If we change the ingress and the egress traffic to $$\left(\frac{\tilde{\alpha}_i}{r}, \frac{\tilde{\beta}_i}{r}\right),$$

then the congestion ratio of the network will be $\leq 1$. The maximum admissible amount of traffic at edge router i is thus $$\left(\frac{\tilde{\alpha}_i}{r}, \frac{\tilde{\beta}_i}{r}\right).$$

The problem of maximizing $\theta$ is now converted to the minimization of r as $\theta=1/r$. Method 1 shows how to use linear programming to find a routing that minimizes r.

Master LP $$\min r$$

$$s.t. \sum_{e \in \Gamma^+(v)} x_{ij}^e - \sum_{e \in \Gamma^-(v)} x_{ij}^e = 0 \quad i, j \in Q, v \neq i, j \quad (2a)$$

$$\sum_{e \in \Gamma^+(v)} x_{ij}^e - \sum_{e \in \Gamma^-(v)} x_{ij}^e = 1 \quad i, j \in Q, v = i \quad (2b)$$

$$\sum_{e \in \Gamma^+(v)} x_{ij}^e - \sum_{e \in \Gamma^-(v)} x_{ij}^e = -1 \quad i, j \in Q, v = j \quad (2c)$$

$$\sum_{i,j \in Q} x_{ij}^e d_{ij} \leq c_e \cdot r \quad e \in E, T \in D \quad (2d)$$

$$0 \leq x_{ij}^e \leq 1 \quad i, j \in Q, e \in E \quad (2e)$$

where (2d) is the bandwidth constraint. Constraint (2d) needs to include all valid traffic matrixes. We can use a slave program to find the T that should be included in constraint (2d). The process works iteratively.

Slave LP $$\max \sum_{i,j \in Q} x_{ij}^e d_{ij}$$

$$s.t. \sum_{j \in Q} d_{ij} \leq \tilde{\alpha}_i \quad i \in Q \quad (3a)$$

$$\sum_{i \in Q} d_{ij} \leq \tilde{\beta}_j \quad j \in Q \quad (3b)$$

Method 1 is summarized in the following steps below.

--- begin
Solve Eq. (2) without constraint (2d) and get the solution $x_{ij}^e$ and r.
repeat
    D = Ø;
    (a) for e := 1 to E do
        2. Solve Eq. (3) and get the solution $d_{ij}$ and $\sum_{i,j \in Q} x_{ij}^e d_{ij}$.
        3. if $\sum_{i,j \in Q} x_{ij}^e d_{ij} \geq c_e \cdot r$ then
        4. Put traffic matrix $T = \{d_{ij}\}$ to D
        5. end if
    (b) end for
    (c) Add new capacity constraints (2d) to Eq. (2), solve it, and get the new solution $x_{ij}^e$ and r.
until no traffic matrix is in D
end

Method 2

We can combine Eqs. (2)-(3) into one linear programming formulation given in Method 2.

$$\min r$$

$$s.t. \sum_{e \in \Gamma^+(v)} x_{ij}^e - \sum_{e \in \Gamma^-(v)} x_{ij}^e = 0 \; i, j \in Q, v \neq i, j \tag{4a}$$

$$\sum_{e \in \Gamma^+(v)} x_{ij}^e - \sum_{e \in \Gamma^-(v)} x_{ij}^e = 1 \; i, j \in Q, v = i \tag{4b}$$

$$\sum_{e \in \Gamma^+(v)} x_{ij}^e - \sum_{e \in \Gamma^-(v)} x_{ij}^e = -1 \; i, j \in Q, v = j \tag{4c}$$

$$\sum_{i \in Q} \tilde{\alpha}_i \pi_e(i) + \sum_{i \in Q} \tilde{\beta}_i \lambda_e(i) \leq c_e \cdot r \; e \in E \tag{4d}$$

$$x_{ij}^e \leq \pi_e(i) + \lambda_e(j) \; i, j \in Q, e \in E \tag{4e}$$

$$0 \leq x_{ij}^e \leq 1 \; i, j \in Q, e \in E \tag{4f}$$

$$\pi_e(i), \lambda_e(i) \geq 0 \; i \in Q, e \in E \tag{4g}$$

Method 3

We can transform Eq. (4) into a different master-slave LP formulation that renders a very fast implementation.

Let $f_{ij}^e = x_{ij}^e \theta$. Since $\theta = (1/r)$, Eq. (4) can be transformed into Eq. (5) given below.

$$\max \theta$$

$$s.t. \sum_{e \in \Gamma^+(v)} f_{ij}^e - \sum_{e \in \Gamma^-(v)} f_{ij}^e = 0 \; i, j \in Q, v \neq i, j \tag{5a}$$

$$\sum_{e \in \Gamma^+(v)} f_{ij}^e - \sum_{e \in \Gamma^-(v)} f_{ij}^e = \theta \; i, j \in Q, v = i \tag{5b}$$

$$\sum_{e \in \Gamma^+(v)} f_{ij}^e - \sum_{e \in \Gamma^-(v)} f_{ij}^e = -\theta \; i, j \in Q, v = j \tag{5c}$$

$$\sum_{i \in Q} \tilde{\alpha}_i \pi_e(i) + \sum_{i \in Q} \tilde{\beta}_i \lambda_e(i) \leq c_e \; e \in E \tag{5d}$$

$$f_{ij}^e \leq \pi_e(i) + \lambda_e(j) \; i, j \in Q, e \in E \tag{5e}$$

$$f, \theta, \pi, \lambda \geq 0 \tag{5f}$$

Eq. (5a)-(5c) and (5e) are derived by multiplying both sides of Eq. (4a)-(4c), and (4c) by $\theta$, and Eq. (5d) is derived by moving r to the left. Note that in Eq. (5), $\pi$ and $\lambda$ are scaled by $\theta$ if we compare them with those in Eq. (4). The important fact about Eq. (5) is that it can be easily decomposed into a master-slave problem which renders a fast implementation.

Master Problem

Master Problem $$\max \theta$$

$$s.t. \sum_{e \in \Gamma^+(v)} f_{ij}^e - \sum_{e \in \Gamma^-(v)} f_{ij}^e = 0 \; i, j \in Q, v \neq i, j \tag{6a}$$

$$\sum_{e \in \Gamma^+(v)} f_{ij}^e - \sum_{e \in \Gamma^-(v)} f_{ij}^e = \theta \; i, j \in Q, v = i \tag{6b}$$

$$\sum_{e \in \Gamma^+(v)} f_{ij}^e - \sum_{e \in \Gamma^-(v)} f_{ij}^e = -\theta \; i, j \in Q, v = j \tag{6c}$$

$$f_{ij}^e \leq \pi_e(i) + \lambda_e(j) \; i, j \in Q, e \in E \tag{6d}$$

$$f, \theta \geq 0 \tag{6e}$$

Slave Problem

Slave Problem $$\max \theta(\phi)$$

$$s.t. \sum_{i \in Q} \tilde{\alpha}_i \pi_e(i) + \sum_{i \in Q} \tilde{\beta}_i \lambda_e(i) \leq c_e \; e \in E \tag{7a}$$

$$\pi, \lambda \geq 0 \tag{7b}$$

where ø is the vector consisting of all variables $\pi_e(i)$ and $\lambda_e(i)$.

For a link e, we define $$(a)\phi_e = [\pi_e(1), \ldots, \pi_e(n), \lambda_e(1), \ldots, \lambda_e(n)]. \tag{8}$$

where n is the number of edge nodes (assuming the set of edge nodes is labeled from 1 to n). Then $$(a)\phi = [\phi_1, \phi_2, \ldots, \phi_m]. \tag{9}$$

where m is the number of links in the network. We call ø the resource-allocation vector and its dimension is 2 mn. If ø is known, the master program produces an optimal $\theta$, denoted by $\theta(\phi)$, for the given ø. The slave program then searches a new ø that can increase the function $\theta(\phi)$. The method is summarized in the following steps.

| | |
|---|---|
| Step 0 | Initialization.<br>Select a sufficiently small value $\epsilon > 0$ denoting the minimum value of the step size. Set the optimal value $z^* = 0$ and the iteration counter k = 1. |
| Step 1 | Determine an initial feasible allocation $\phi_1$.<br>Set $\pi_e(i) = c_e/(2n \cdot \alpha_i)$, $\lambda_e(i) = c_e/(2n \cdot \beta_i)$ for $i \in Q$. |
| Step 2 | Solve the Eq. (6).<br>Solve the Eq. (6) based on the current resource allocation $\phi_k$.<br>If $\theta(\phi_k) > z^*$, then save the flows, set $z^* = \theta(\phi_k)$. |
| Step 3 | Determine a new allocation.<br>Compute the subgradient $\gamma_k$. Determine a new allocation $\phi_{k+1} \leftarrow \phi_k + t_k \cdot \gamma_k$. If $\phi_{k+1}$ is feasible move to this point. Otherwise, project $\phi_{k+1}$ onto the feasible region. |
| Step 4 | Check the convergence.<br>If the step size $t_k < \epsilon$, terminate the algorithm. Otherwise, set k = k + 1 and return to Step 2. |

Method 4

Setting Path Limit

We can add a path limit to the algorithms above. Let L be the number of paths allowed for each source-destination pair. We first use Method 3 to produce a set of paths for each source-destination pair. We then select the most loaded L paths among those generated by Method 3 (or Method 2). Given the set of paths, we can re-compute θ by solving a linear programming problem similar to that given in Eq. (5). The difference is that path-flow representation, instead of link-flow representation, must be used in the formulation. Let $P_{ij}$ be the set of paths between the node pair (i,j), x (p) the amount of flow sent on path p, and $\delta_e$ (p) a link-path indicator variable, that is, $\delta_e$ (p) equals 1 if link e is contained in the path p, and 0 otherwise. Following a similar formulation of Eq. (5), we can use the following linear programming formulation to find the maximum θ. Method 4 can be easily solved with a typical LP solver.

$$\max \theta$$

$$s.t. \sum_{p \in P_{ij}} x(p) = \theta \quad i, j \in Q \tag{10a}$$

$$\sum_{i \in Q} \tilde{\alpha}_i \pi_e(i) + \sum_{i \in Q} \tilde{\beta}_i \lambda_e(i) \leq c_e \quad e \in E \tag{10b}$$

$$\sum_{p \in P_{ij}} \delta_e(p) x(p) \leq \pi_e(i) + \lambda_e(j) \quad i, j \in Q, e \in E \tag{10c}$$

$$x, \theta, \pi, \lambda \geq 0 \tag{10d}$$

The foregoing description of the invention has been presented for purposes of illustration and description. It is not intended to be exhaustive or to limit the invention to the precise embodiments disclosed. The invention, for example, can be implemented in a computing system with one or more programmable processors executing a computer program to perform functions of the invention. Method can also be performed by, for example, logic circuitry, ASIC, and the like. The processors suitable for execution of a computer program include, for example, general and specific microprocessors of various kinds of digital computers. The computer system may include, for example, a display device, a pointing device, an input device, in addition to the processor.

Those skilled in the art will readily observe that numerous modifications and alterations of the device may be made without departing from the scope, spirit or teachings of the invention. The invention is defined by the following claims and their equivalents:

What I claimed is:

1. A method for establishing service level agreements by an electronic computing device in a network with a plurality of routers with predetermined paths, comprising: Computing an admissible ingress traffic for a source router; Computing an admissible egress traffic for the source router;
   Computing an admissible ingress traffic for a destination router;
   Computing an admissible egress traffic for the destination router; and
   Adding a service level agreement to the network using the predetermined paths between the source router and the destination router if the computed admissible ingress and egress traffic for the source router and the destination router are not exceeded whereby the service level agreement is added without checking a capacity of internal links of the predetermined paths, wherein a maximum admissible ingress and a maximum egress traffic of the source and destination routers are computed based a congestion ratio comprising a minimum value r, wherein the minimum value r and the predetermined paths are solved by a linear programming formulation comprising a master-slave formulation where:

Master linear programming is

Master LP is $$s.t. \sum_{e \in \Gamma^+(v)} x_{ij}^e - \sum_{e \in \Gamma^-(v)} x_{ij}^e = 0 \quad i, j \in Q, v \neq i, j$$

$$\sum_{e \in \Gamma^+(v)} x_{ij}^e - \sum_{e \in \Gamma^-(v)} x_{ij}^e = 1 \quad i, j \in Q, v = i$$

$$\sum_{e \in \Gamma^+(v)} x_{ij}^e - \sum_{e \in \Gamma^-(v)} x_{ij}^e = -1 \quad i, j \in Q, v = j$$

$$\sum_{i,j \in Q} x_{ij}^e d_{ij} \leq c_e \cdot r \quad e \in E, T \in D$$

$$0 \leq x_{ij}^e \leq 1 \quad i, j \in Q, e \in E$$

and Slave LP is $$\max \sum_{i,j \in Q} x_{ij}^e d_{ij}$$

$$s.t. \sum_{j \in Q} d_{ij} \leq \tilde{\alpha}_i \quad i \in Q$$

$$\sum_{i \in Q} d_{ij} \leq \tilde{\beta}_j \quad j \in Q$$

and Slave linear programming is $$\max \sum_{i,j \in Q} x_{ij}^e d_{ij}$$

$$s.t. \sum_{j \in Q} d_{ij} \leq \tilde{\alpha}_i \quad i \in Q$$

$$\sum_{i \in Q} d_{ij} \leq \tilde{\beta}_j \quad j \in Q$$

and where v, i, and j are indices; Q denotes a set of edge routers; E denotes the internal links, T denotes traffic matrixes; $x_{ij}^e$ denotes a portion of traffic from node i to j through a link e and $0 \leq x_{ij}^e \leq 1$; $d_{ij}$ represents the traffic rate from node i to node j; and wherein the maximum admissible traffic of the ingress and egress direction are $\theta \tilde{\alpha}_i$ and $\theta \tilde{\beta}_i$ with $\tilde{\alpha}_i$ and $\tilde{\beta}_i$ being constants.

2. The method of claim 1, wherein the predetermined paths are generated according to a hop-count limit.

3. The method of claim 1, wherein the predetermined paths are generated according to a maximum number of allowable paths.

4. The method of claim 1 further comprising the step of generating a load balancing scheme among the predetermined paths for the added service level agreement.

5. The method of claim 4, wherein the load balancing scheme is based on a destination.

6. The method of claim 4, wherein the load balancing scheme I based on a destination host and a TCP channel.

7. The method of claim 1, further comprising calculating a maximum capacity of the internal links in the network.

8. The method of claim 1, further comprising the step of limiting the predetermined paths.

9. The method of claim 8, wherein the step of limiting the predetermined paths comprises solving a linear programming solver for the predetermined paths comprising $$\max \theta$$
$$s.t. \sum_{p \in P_{ij}} x(p) = \theta \quad i, j \in Q$$
$$\sum_{i \in Q} \tilde{\alpha}_i \pi_e(i) + \sum_{i \in Q} \tilde{\beta}_i \lambda_e(i) \leq c_e \quad e \in E$$
$$\sum_{p \in P_{ij}} \delta_e(p) x(p) \leq \pi_e(i) + \lambda_e(j) \quad i, j \in Q, e \in E$$
$$x, \theta, \pi, \lambda \geq 0$$

wherein θ denotes the maximum ingress and egress traffic, x(p) denotes an amount of flow sent on path p, $\delta_e(p)$ a link-path indicator variable such that $\delta_e(p)$ equals 1 if a link e is contained in the path p else 0, wherein π and λ being corresponding dual multipliers for constraints of the Slave Program.

10. A computer-readable medium encoded with a computer program for establishing service level agreements among a plurality of routers with predetermined paths in a network, said computer program comprises instructions operable to cause processing apparatus to:

Compute an admissible ingress traffic for a source router;
Compute an admissible egress traffic for the source router;
Compute an admissible ingress traffic for a destination router;
Compute an admissible egress traffic for the destination router; and
Add a service level agreement to the network using the predetermined paths between the source router and the destination router if the computed admissible ingress and egress traffic for the source router and the destination router are not exceeded whereby the service level agreement is added without checking a capacity of internal links of the predetermined paths, wherein a maximum admissible ingress and a maximum egress traffic of the source and destination routers are computed based a congestion ratio comprising a minimum value r, wherein the minimum value r and the predetermined paths are solved by a linear programming formulation comprising a master-slave formulation where:

Master linear programming is

Master LP is $$\min r$$
$$s.t. \sum_{e \in \Gamma^+(v)} x_{ij}^e - \sum_{e \in \Gamma^-(v)} x_{ij}^e = 0 \quad i, j \in Q, v \neq i, j$$
$$\sum_{e \in \Gamma^+(v)} x_{ij}^e - \sum_{e \in \Gamma^-(v)} x_{ij}^e = 1 \quad i, j \in Q, v = i$$
$$\sum_{e \in \Gamma^+(v)} x_{ij}^e - \sum_{e \in \Gamma^-(v)} x_{ij}^e = -1 \quad i, j \in Q, v = j$$
$$\sum_{i,j \in Q} x_{ij}^e d_{ij} \leq c_e \cdot r \quad e \in E, T \in D$$
$$0 \leq x_{ij}^e \leq 1 \quad i, j \in Q, e \in E$$

and Slave LP is

-continued $$\max \sum_{i,j \in Q} x_{ij}^e d_{ij}$$
$$s.t. \sum_{j \in Q} d_{ij} \leq \tilde{\alpha}_i \quad i \in Q$$
$$\sum_{i \in Q} d_{ij} \leq \tilde{\beta}_j \quad j \in Q$$

and Slave linear programming is $$\max \sum_{i,j \in Q} x_{ij}^e d_{ij}$$
$$s.t. \sum_{j \in Q} d_{ij} \leq \tilde{\alpha}_i \quad i \in Q$$
$$\sum_{i \in Q} d_{ij} \leq \tilde{\beta}_j \quad j \in Q$$

and where v, i, and j are indices; Q denotes a set of edge routers; E denotes the internal links, T denotes traffic matrixes; $x_{ij}^e$ denotes a portion of traffic from node i to j through a link e and $0 \leq x_{ij}^e \leq 1$; $d_{ij}$ represents the traffic rate from node i to node j; and wherein the maximum admissible traffic of the ingress and egress direction are $\theta \tilde{\alpha}_i$ and $\theta \tilde{\beta}_i$ with $\tilde{\alpha}_i$ and $\tilde{\beta}_i$ being constants.

11. The computer-readable medium of claim 10, wherein the predetermined paths are generated according to a hop-count limit.

12. The computer-readable medium of claim 10, wherein the predetermined paths are generated according to a maximum number of allowable paths.

13. The computer-readable medium of claim 10 encoded with the computer program which further comprises instructions to generate a load balancing scheme among the predetermined paths for the added service level agreement.

14. The computer-readable medium of claim 13, wherein the load balancing scheme is based on a destination host.

15. The computer-readable medium of claim 13, wherein the load balancing scheme is based on a destination host and a TCP channel.

16. The computer-readable medium of claim 13 encoded with the computer program which further comprises instructions to calculate a maximum capacity of the internal links in the network.

17. A system for establishing service level agreements in a network with a plurality of routers with predetermined paths, comprising apparatus for enabling the steps of:

Computing admissible ingress traffic for a source router;
Computing an admissible egress traffic for the source router;
Computing an admissible ingress traffic for a destination router;
Computing an admissible egress traffic for the destination router; and
Adding a service level agreement to the network using the predetermined paths between the source router and the destination router if the computed admissible ingress and egress traffic for the source router and the destination router are not exceeded whereby the service level agreement is added without checking a capacity of internal links of the predetermined paths, wherein a maximum admissible ingress and a maximum egress traffic of the source and destination routers are computed based a congestion ratio comprising a minimum value r, wherein the minimum value r and the predetermined paths are solved by a linear programming formulation comprising a master-slave formulation where:

Master linear programming is

Master LP is $$\text{s.t.} \quad \min r$$

$$\sum_{e \in \Gamma^+(v)} x_{ij}^e - \sum_{e \in \Gamma^-(v)} x_{ij}^e = 0 \quad i, j \in Q, v \neq i, j$$

$$\sum_{e \in \Gamma^+(v)} x_{ij}^e - \sum_{e \in \Gamma^-(v)} x_{ij}^e = 1 \quad i, j \in Q, v = i$$

$$\sum_{e \in \Gamma^+(v)} x_{ij}^e - \sum_{e \in \Gamma^-(v)} x_{ij}^e = -1 \quad i, j \in Q, v = j$$

$$\sum_{i,j \in Q} x_{ij}^e d_{ij} \leq c_e \cdot r \quad e \in E, T \in D$$

$$0 \leq x_{ij}^e \leq 1 \quad i, j \in Q, e \in E$$

and Slave LP is $$\max \sum_{i,j \in Q} x_{ij}^e d_{ij}$$

$$\text{s.t.} \sum_{j \in Q} d_{ij} \leq \tilde{\alpha}_i \quad i \in Q$$

$$\sum_{i \in Q} d_{ij} \leq \tilde{\beta}_j \quad j \in Q$$

and Slave linear programming is $$\max \sum_{i,j \in Q} x_{ij}^e d_{ij}$$

$$\text{s.t.} \sum_{j \in Q} d_{ij} \leq \tilde{\alpha}_i \quad i \in Q$$

$$\sum_{i \in Q} d_{ij} \leq \tilde{\beta}_j \quad j \in Q$$

and where v, i, and j are indices; Q denotes a set of edge routers; E denotes the internal links, T denotes traffic matrixes; $x_{ij}^e$ denotes a portion of traffic from node i to j through a link e and $0 \leq x_{ij}^e \leq 1$; $d_{ij}$ represents the traffic rate from node i to node j; and wherein the maximum admissible traffic of the ingress and egress direction are $\theta \tilde{\alpha}_i$ and $\theta \tilde{\beta}_i$ with $\tilde{\alpha}_i$ and $\tilde{\beta}_i$ being constants.

18. A method for establishing service level agreements network by an electronic computing device in a network with a plurality of routers with predetermined paths, comprising:
Computing an admissible ingress traffic for a source router;
Computing an admissible egress traffic for the source router;
Computing an admissible ingress traffic for a destination router;
Computing an admissible egress traffic for the destination router; and
Adding a service level agreement to the network using the predetermined paths between the source router and the destination router if the computed admissible ingress and egress traffic for the source router and the destination router are not exceeded whereby the service level agreement is added without checking a capacity of internal links of the predetermined paths, wherein a maximum admissible ingress and a maximum egress traffic of the source and destination routers are computed based a congestion ratio comprising a minimum value r, wherein the minimum value r and the predetermined paths are solved by a linear programming formulation comprising Master LP is $$\text{s.t.} \quad \min r$$

$$\sum_{e \in \Gamma^+(v)} x_{ij}^e - \sum_{e \in \Gamma^-(v)} x_{ij}^e = 0 \quad i, j \in Q, v \neq i, j$$

$$\sum_{e \in \Gamma^+(v)} x_{ij}^e - \sum_{e \in \Gamma^-(v)} x_{ij}^e = 1 \quad i, j \in Q, v = i$$

$$\sum_{e \in \Gamma^+(v)} x_{ij}^e - \sum_{e \in \Gamma^-(v)} x_{ij}^e = -1 \quad i, j \in Q, v = j$$

$$\sum_{i,j \in Q} x_{ij}^e d_{ij} \leq c_e \cdot r \quad e \in E, T \in D$$

$$0 \leq x_{ij}^e \leq 1 \quad i, j \in Q, e \in E$$

and Slave LP is $$\max \sum_{i,j \in Q} x_{ij}^e d_{ij}$$

$$\text{s.t.} \sum_{j \in Q} d_{ij} \leq \tilde{\alpha}_i \quad i \in Q$$

$$\sum_{i \in Q} d_{ij} \leq \tilde{\beta}_j \quad j \in Q$$

where v, I and j are indices; Q denotes a set of edge routers; E denotes the internal links, T denotes traffic matrixes; $x_{ij}^e$ denotes a portion of traffic from node i to j through a link e and $0 \leq x_{ij}^e \leq 1$; $d_{ij}$ represents the traffic rate from node i to node j; $\pi$ and $\lambda$ being corresponding dual multipliers for constraints of the Slave linear programming;
and wherein the maximum admissible traffic of the ingress and egress direction are $\theta \tilde{\alpha}_i$ and $\theta \tilde{\beta}_i$ with $\tilde{\alpha}_i$ and $\tilde{\beta}_i$ being constants.

19. A method for establishing service level agreements network by an electronic computing device in a network with a plurality of routers with predetermined paths, comprising:
Computing an admissible ingress traffic for a source router;
Computing an admissible egress traffic for the source router;
Computing an admissible ingress traffic for a destination router;
Computing an admissible egress traffic for the destination router; and
Adding a service level agreement to the network using the predetermined paths between the source router and the destination router if the computed admissible ingress and egress traffic for the source router and the destination router are not exceeded whereby the service level agreement is added without checking a capacity of internal links of the predetermined paths, wherein a maximum admissible ingress and a maximum egress traffic of the source and destination routers are computed based a congestion ratio comprising a minimum value r, wherein the minimum value r and the predetermined paths are solved by a linear programming formulation comprising a master-slave formulation where:

Master Program is $$\text{s.t.} \max \theta$$
$$\sum_{e\in\Gamma^+(v)} f_{ij}^e - \sum_{e\in\Gamma^-(v)} f_{ij}^e = 0 \quad i, j \in Q, v \neq i, j$$

$$\sum_{e\in\Gamma^+(v)} f_{ij}^e - \sum_{e\in\Gamma^-(v)} f_{ij}^e = \theta \quad i, j \in Q, v = i$$

$$\sum_{e\in\Gamma^+(v)} f_{ij}^e - \sum_{e\in\Gamma^-(v)} f_{ij}^e = -\theta \quad i, j \in Q, v = j$$

$$f_{ij}^e \leq \pi_e(i) + \lambda_e(j) \quad i, j \in Q, e \in E$$

$$f, \theta \geq 0$$

Slave Program is $$\text{s.t.} \max \theta(\phi)$$
$$\sum_{i\in Q} \tilde{\alpha}_i \pi_e(i) + \sum_{i\in Q} \tilde{\beta}_i \lambda_e(i) \leq c_e \quad e \in E$$

$$\pi, \lambda \geq 0$$

Slave Program is $$\max \theta(\phi)$$
$$\text{s.t.} \sum_{i\in Q} \tilde{\alpha}_i \pi_e(i) + \sum_{i\in Q} \tilde{\beta}_i \lambda_e(i) \leq c_e \quad e \in E$$

$$\pi, \lambda \geq 0$$

where v, I and j are indices and where $\emptyset=[\phi_1, \phi_2, \ldots, \phi_m]$ and $\phi_e=[\pi_e(1), \ldots, \pi_e(n), \lambda_e(1), \ldots, \lambda_e(n)]$, n is the number of edge nodes from 1 to n, m is the number of links in the network, $\theta=1/r$; and where the Master Program produces an optimal $\theta$ denoted by $\theta(\emptyset)$ for the given ø and the slave program searches a new value of ø that increases the function $\theta(\emptyset)$ and $\pi$ and $\lambda$ being corresponding dual multipliers for constraints of the Slave Program.

* * * * *